US010692262B2

(12) United States Patent
Lim et al.

(10) Patent No.: US 10,692,262 B2
(45) Date of Patent: Jun. 23, 2020

(54) APPARATUS AND METHOD FOR PROCESSING INFORMATION OF MULTIPLE CAMERAS

(71) Applicant: Electronics and Telecommunications Research Institute, Daejeon (KR)

(72) Inventors: Seong Yong Lim, Daejeon (KR); Yong Ju Cho, Daejeon (KR); Jeong Il Seo, Daejeon (KR); Joo Myoung Seok, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 123 days.

(21) Appl. No.: 15/868,534

(22) Filed: Jan. 11, 2018

(65) Prior Publication Data

US 2018/0197320 A1 Jul. 12, 2018

(30) Foreign Application Priority Data

Jan. 12, 2017 (KR) .................. 10-2017-0005294
Nov. 6, 2017 (KR) .................. 10-2017-0146947

(51) Int. Cl.
*G06K 9/00* (2006.01)
*G06T 11/60* (2006.01)
(Continued)

(52) U.S. Cl.
CPC .............. *G06T 11/60* (2013.01); *G06T 7/593* (2017.01); *G06T 7/70* (2017.01); *H04N 5/23238* (2013.01);
(Continued)

(58) Field of Classification Search
CPC . G06T 11/60; G06T 7/593; G06T 7/70; G06T 7/38; G06T 7/97; G06T 7/285;
(Continued)

(56) References Cited

U.S. PATENT DOCUMENTS 6,141,034 A 10/2000 McCutchen
6,657,667 B1 12/2003 Anderson
(Continued)

OTHER PUBLICATIONS

Seong Yong Lim et al., International Organisation for Standardisation Organisation Internationale De Normalisation ISO/IEC JTC1/SC29/WG11 Coding of Moving Pictures and Audio, "Comments on Spatial information of sources and sourcing environment for MORE", 11 pages, Jan. 2017, Geneve, Switzerland.
(Continued)

*Primary Examiner* — Jose L Couso
(74) *Attorney, Agent, or Firm* — William Park & Associates Ltd.

(57) ABSTRACT

Disclosed is an apparatus and method for processing information of multiple cameras. The apparatus for processing information of multiple cameras according to an embodiment of the present disclosure includes: multiple cameras obtaining an image containing at least one object; a location information identification unit identifying location information between the at least one object and one of the multiple cameras, the location information identification unit being provided in each of the multiple cameras, wherein the location information comprises a device identifier identifying the location information identification unit and a location data between the at least one object and one of the multiple cameras; and an image processor processing image information obtained from the multiple cameras by using the location information received from the location information identification unit and converting the device identifier received from the location information identification unit into an object identifier identifying the at least one object.

19 Claims, 9 Drawing Sheets

(51) Int. Cl.
*G06T 7/70* (2017.01)
*H04N 5/247* (2006.01)
*H04N 5/232* (2006.01)
*G06T 7/593* (2017.01)

(52) U.S. Cl.
CPC ... *H04N 5/247* (2013.01); *G06T 2207/10012* (2013.01); *G06T 2207/10024* (2013.01)

(58) Field of Classification Search
CPC .......... G06T 7/55; G06T 7/586; G06T 7/596; G06T 7/73; G06T 7/74; G06T 7/75; G06T 7/77; G06T 7/85; G06T 13/20; G06T 15/20; G06T 15/205; G06T 2207/10012; G06T 2207/10024; G06T 2207/10016; G06T 2207/10021; G06T 2207/20088; G06T 2207/20228; G06T 2200/04; G06T 2200/08; H04N 5/23238; H04N 5/247; H04N 5/23229; H04N 13/221; H04N 13/239; H04N 13/243; H04N 13/246; H04N 13/10; H04N 13/122; H04N 13/204; H04N 13/282; H04N 13/286; H04N 13/289; H04N 13/293; H04N 13/296; H04N 13/398; H04N 19/597; H04N 21/21805; H04N 21/816; H04N 2013/0088; H04N 2013/0074; H04N 2013/0081; H04N 2013/0085; H04N 2013/0092; H04N 2013/405; H04N 2213/00; G02B 27/22; G02B 13/06; G02B 21/22; G02B 2027/0134; G02B 2027/0138; G03B 35/08; G03B 37/04; G06K 9/6202; G06K 9/209

See application file for complete search history.

(56) References Cited

U.S. PATENT DOCUMENTS

| | | | |
|---|---|---|---|
| 7,596,281 | B2 | 9/2009 | Irani et al. |
| 9,652,828 | B1* | 5/2017 | Sabripour ............ G06T 3/4038 |
| 9,996,945 | B1* | 6/2018 | Holzer ............... G06K 9/00671 |
| 10,368,011 | B2* | 7/2019 | Annau ................... H04N 5/247 |
| 10,425,570 | B2* | 9/2019 | van Hoff .................. G06T 7/97 |
| 2006/0029256 | A1* | 2/2006 | Miyoshi ............... G06K 9/2036 382/104 |
| 2008/0199091 | A1 | 8/2008 | Srinivasan et al. |
| 2011/0242342 | A1 | 10/2011 | Goma et al. |
| 2013/0124471 | A1* | 5/2013 | Chen .................. H04N 5/23238 707/624 |
| 2015/0063453 | A1 | 3/2015 | Kang et al. |
| 2015/0092836 | A1 | 4/2015 | Kang et al. |
| 2018/0176530 | A1* | 6/2018 | Shintani ................. G01B 11/00 |
| 2018/0232943 | A1* | 8/2018 | Shikata ............ H04N 21/23412 |
| 2018/0293774 | A1* | 10/2018 | Yu ........................... G06T 13/20 |
| 2018/0302550 | A1* | 10/2018 | Briggs ................ G06K 9/6269 |
| 2018/0316902 | A1* | 11/2018 | Tanaka .................. H04N 13/00 |
| 2018/0322337 | A1* | 11/2018 | Marty ................ G06K 9/00342 |
| 2018/0324410 | A1* | 11/2018 | Roine ................... G06T 3/4038 |
| 2018/0330175 | A1* | 11/2018 | Corcoran ............... H04N 5/247 |
| 2018/0336724 | A1* | 11/2018 | Spring ..................... G06T 7/70 |
| 2018/0367788 | A1* | 12/2018 | Haimovitch-Yogev ..................... G06T 7/11 |

OTHER PUBLICATIONS

Seong Yong Lim, "m40124—Comments on Spatial information of sources and sourcing environment for MORE", Jan. 15, 2017, 10 pages, ETRI, Daejeon, Republic of Korea.

* cited by examiner

APPARATUS AND METHOD FOR PROCESSING INFORMATION OF MULTIPLE CAMERAS

CROSS REFERENCE TO RELATED APPLICATION

The present application claims priority to Korean Patent Application Nos. 10-2017-0005294, filed Jan. 12, 2017, and 10-2017-0146947, filed Nov. 6, 2017, the entire contents of which is incorporated herein for all purposes by this reference.

BACKGROUND OF THE INVENTION

Field of the Invention

The present disclosure relates generally to an apparatus and method for processing information of multiple cameras. More particularly, the present disclosure relates to an apparatus and method for processing an image obtained through a multi-camera system.

Description of the Related Art

With the increase of high definition (HD) content, and realistic media content, such as three-dimensional images, ultra high definition (UHD) images, etc. has been developed to meet the needs of viewers who desire more realistic images.

Recently, among realistic media content, there is a growing interest in high-resolution panoramic image content that maximizes immersion and realism by providing wide field of view (FOV), or virtual reality (VR) content providing 360° omnidirectional images.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, in order to construct such high-resolution panoramic image content or virtual reality (VR) content, a technique of obtaining a multi-view image using multiple cameras, a technique of generating a panoramic image using a multi-view image, a multi-projection display technique for high-resolution image rendering, etc. are required to be developed.

The present disclosure is intended to propose a method and apparatus capable of effectively generating realistic media content or processing displaying.

Also, the present disclosure is intended to propose a method and apparatus for efficiently and quickly processing multi-view images composing the realistic media content.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided an apparatus for processing information of multiple cameras, the apparatus including: multiple cameras obtaining an image containing at least one object; a location information identification unit identifying location information between the at least one object and one of the multiple cameras, the location information identification unit being provided in each of the multiple cameras, wherein the location information comprises a device identifier identifying the location information identification unit and a location data between the at least one object and one of the multiple cameras; and an image processor processing image information obtained from the multiple cameras by using the location information received from the location information identification unit and converting the device identifier received from the location information identification unit into an object identifier identifying the at least one object.

According to another aspect of the present disclosure, there is provided a method of processing information of multiple cameras, the method comprising: obtaining an image containing at least one object by using multiple cameras; determining location information from each of the multiple cameras to the at least one object, wherein the location information comprises a device identifier identifying the location information identification unit and a location data between the at least one object and one of the multiple cameras; and processing, by using the location information, image information obtained from the multiple cameras, wherein the processing of the image information comprises: determining the device identifier and the location data; and converting the device identifier into an object identifier identifying the at least one object.

According to another aspect of the present disclosure, there is provided a method of providing a synthetic image using multiple cameras, the method including: receiving multiple images obtained from multiple cameras; receiving multiple pieces of location information provided from multiple location information identification units respectively provided at locations corresponding to the multiple cameras; matching an original pixel included in each of the multiple images with a synthetic pixel included in a synthetic image in consideration of the location information corresponding to the multiple cameras and a relation between the multiple images and the synthetic image; identifying a value of the original pixel for each of the multiple images and applying the value of the original pixel to a value of the synthetic pixel; and generating the synthetic image by combining values of synthetic pixels.

According to another aspect of the present disclosure, there is provided an apparatus for providing a synthetic image, which is a combination of multiple images, using multiple cameras, the apparatus comprising: multiple cameras obtaining an image containing at least one object; a location information identification unit identifying location information between the at least one object and one of the multiple cameras, the location information identification unit being provided in each of the multiple cameras; and an image processor matching an original pixel included in each of the multiple images with a synthetic pixel included in a synthetic image in consideration of the location information corresponding to the multiple cameras and a relation between the multiple images and the synthetic image, identifying a value of the original pixel for each of the multiple images and applying the value of the original pixel to a value of the synthetic pixel, and generating the synthetic image by combining values of synthetic pixels.

It is to be understood that the foregoing summarized features are exemplary aspects of the following detailed description of the present disclosure without limiting the scope of the present disclosure.

According to the present disclosure, a method and apparatus for effectively generating realistic media content or processing displaying can be provided.

Also, according to the present disclosure, a method and apparatus for efficiently and quickly processing multi-view images composing the realistic media content can be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
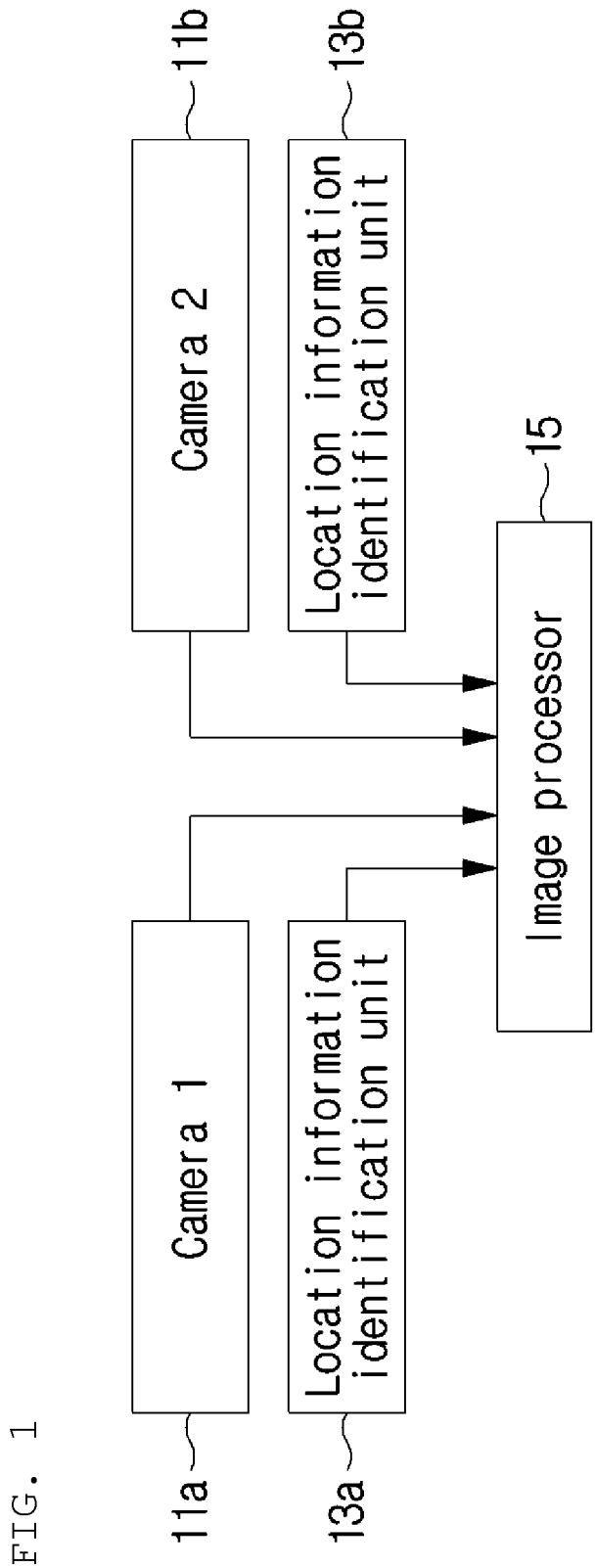
FIG. 1 is a block diagram illustrating configurations of an apparatus for processing information of multiple cameras according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components is included in the scope of the present disclosure.

Hereinafter, embodiment of the present disclosure will be described with reference to the accompanying drawings.

Figure 2:
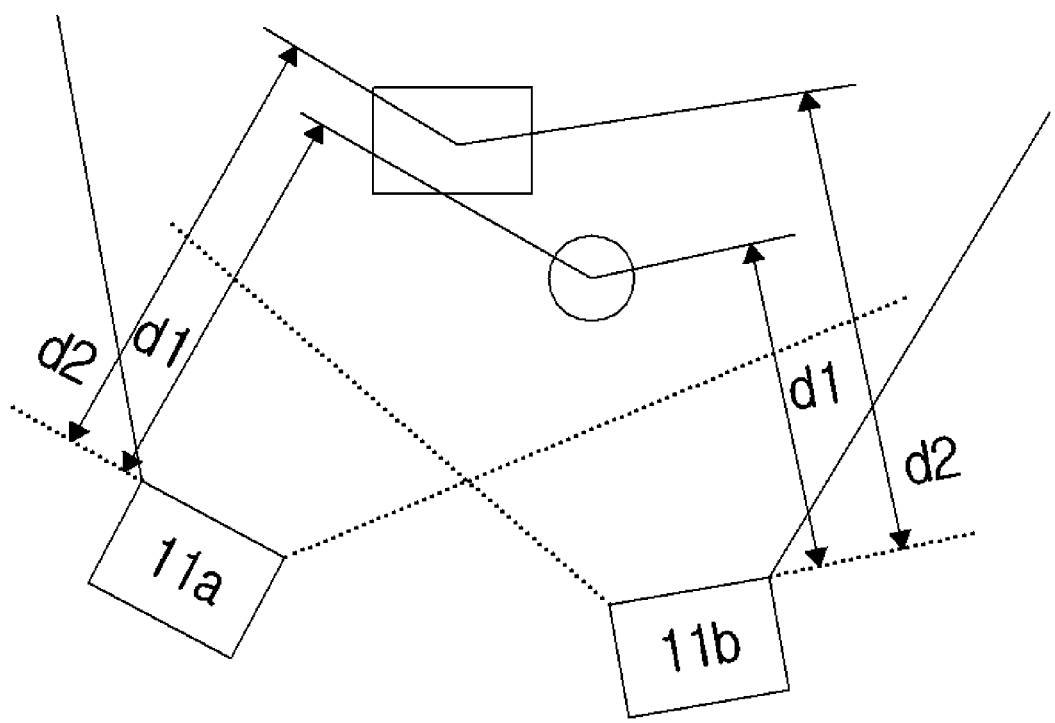
FIG. 2 is a view illustrating a relation between an image and an apparatus for processing information of multiple cameras according to an embodiment of the present disclosure.

FIG. 1 is a block diagram illustrating configurations of an apparatus for processing information of multiple cameras according to an embodiment of the present disclosure. FIG. 2 is a view illustrating a relation between an image and an apparatus for processing information of multiple cameras according to an embodiment of the present disclosure.

Referring to FIGS. 1 and 2, the apparatus for processing information of multiple cameras may include multiple cameras 11a and 11b, location information identification units 13a and 13b, and an image processor 15.

The multiple cameras 11a, 11b are cameras provided based on a multi-camera system, and may be cameras capable of obtaining an image by setting a photographing direction, a photographing direction, etc. Also, the multiple cameras 11a and 11b may receive a control command for controlling photographing start, termination, etc., and may control photographing of an image or photographing termination in compliance with the control command. A photographing time of the obtained image may be synchronized.

In the embodiment of the present disclosure, the image obtained through the multiple cameras 11a and 11b may include a still image and a video which is a combination of still images obtained at predetermined intervals.

The location information identification units 13a and 13b may be devices for obtaining correlation location information of the multiple cameras 11a and 11b. For example, the location information identification units 13a and 13b may include distance meters measuring distances between a subject photographed by the multiple cameras 11a and 11b and the multiple cameras 11a and 11b.

The location information identification units 13a and 13b may be respectively provided in the multiple cameras 11a and 11b, or may be provided separately from the multiple cameras 11a and 11b. The location information identification units 13a and 13b may measure a distance to the subject included in an area corresponding to an image obtained by the multiple cameras 11a and 11b.

The location information identification units 13a and 13b may output both a location information identification device identifier that identifies each device and distance data obtained measuring a distance to the detected subject (or an object) as location information.

As another example, the location information identification unit 13a and 13b may respectively include depth cameras. Areas photographed by the depth cameras may be respectively set as areas corresponding to areas photographed by the relevant multiple cameras 11a and 11b. The depth camera may photograph the area to obtain and provide a depth image.

The image processor 15 may identify information on the photographing direction, the photographing direction, etc. of the multiple cameras 11a and 11b provided based on the multi-camera system. Also, the image processor 15 may generate a synthetic image by applying geometric information of an image obtained at the positions of the multiple cameras 11a and 11b.

Figure 3A:
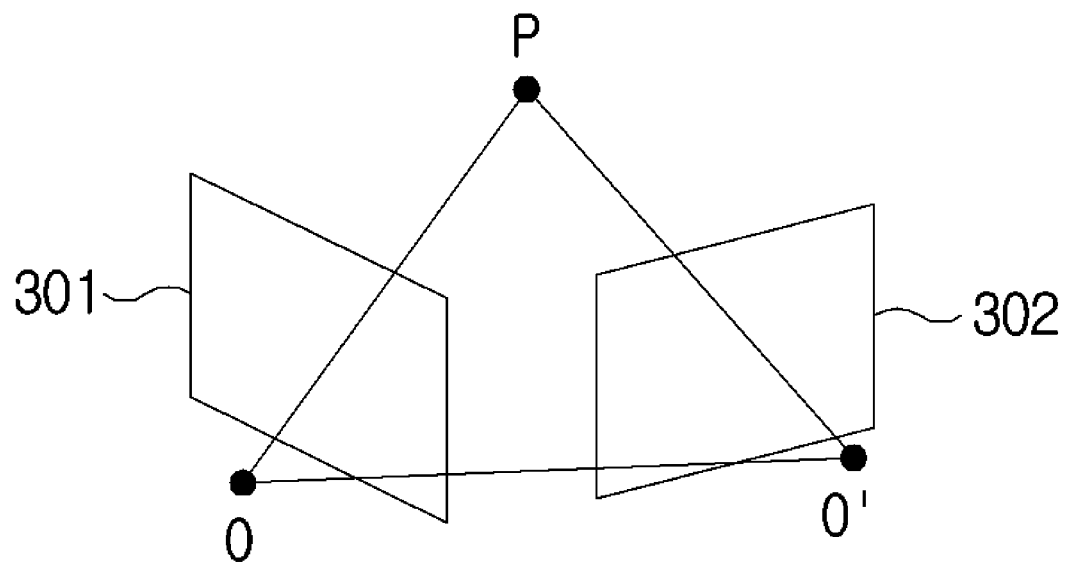
FIGS. 3A and 3B are views illustrating a geometric relation between original images that are basis for a synthetic image used by an apparatus for processing information of multiple cameras according to an embodiment of the present disclosure.
Figure 3B:
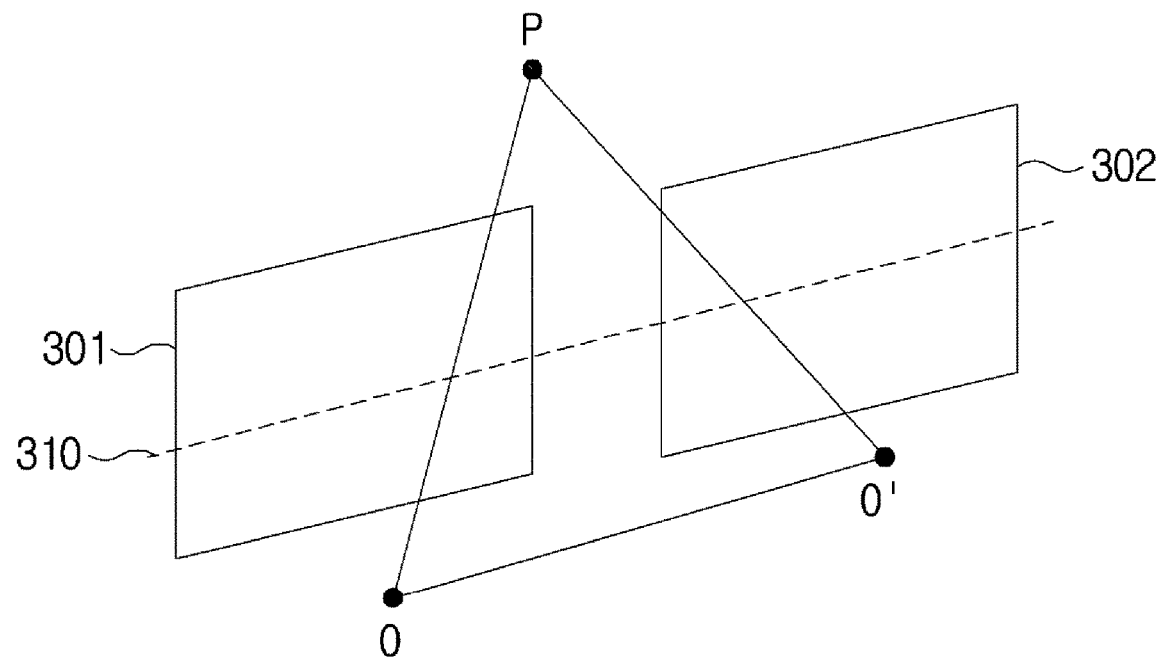

For example, referring to FIGS. 3A and 3B, the first image 301 and the second image 302 are images obtained by cameras 11a and 11b located at different photographing locations.

As described above, in the cases of images obtained at different photographing locations, it is difficult to fine corresponding points due to geometric errors between two images. That is, as shown in FIG. 3A, the first image 301 and the second image 302 may have a difference in positions of cameras photographing a point (P), an error caused by arrangement of the cameras, a difference in internal characteristics of the cameras, etc. Considering this, the image processor 15 may perform image rectification by setting, on the first image 301 and the second image 302, a line 310 (i.e., an epipolar line) on which corresponding points are located. In a three-dimensional image (e.g., a stereo image), one point of the first image 301 corresponds to a line of the second image 302, and the line is the epipolar line 310. In order to align the epipolar line 310, it is possible to perform camera calibration using internal and external parameter information (e.g., a focal length, a position of a principal point, distortion of an image, relative rotation angle and position between cameras) of the cameras obtaining the first image 301 and the second image 302.

Furthermore, a color difference between two points of time caused by color characteristics of the multiple cameras, illumination, a shadow, etc. may result in subjective image degradation during image synthesis. The image processor 15 may extract corresponding points existing in the first image 301 and the first image 30, and may perform calibration on a color difference between the corresponding points.

Also, the image processor 15 generates a three-dimensional synthetic image through a geometric process of transforming the first image 301 and the second image 302 on which image rectification is performed into a three-dimensional coordinate system. For example, the image processor 15 may generate a three-dimensional synthetic image by projecting the first image 301 and the second image 302 on which image rectification is performed onto a cylindrical area or a spherical surface.

As described above, the image processor 15 may use location information of the multiple cameras 11a and 11b in performing rectification and geometric transformation on the image obtained by the multiple cameras 11a and 11b. The location information of the multiple cameras 11a and 11b may be received from the location information identification units 13a and 13b.

Furthermore, when the location information identification units 13a and 13b provide a location information identification device identifier that identifies each device and location information including the distance data obtained measuring a distance to the detected subject (or object), the image processor 15 may convert the location information identification device identifier into an object identifier. Thus, the image processor 15 uses the object identifier to identify the distance data from a relevant camera to the object, and uses the distance data in image rectification and geometric transformation.

In the meantime, when the location information identification units 13a and 13b provide the depth image, the image processor 15 may calculate distance data from a relevant camera to an object based on the depth image, and may use the calculated distance data in image rectification and geometric transformation.

Figure 4:
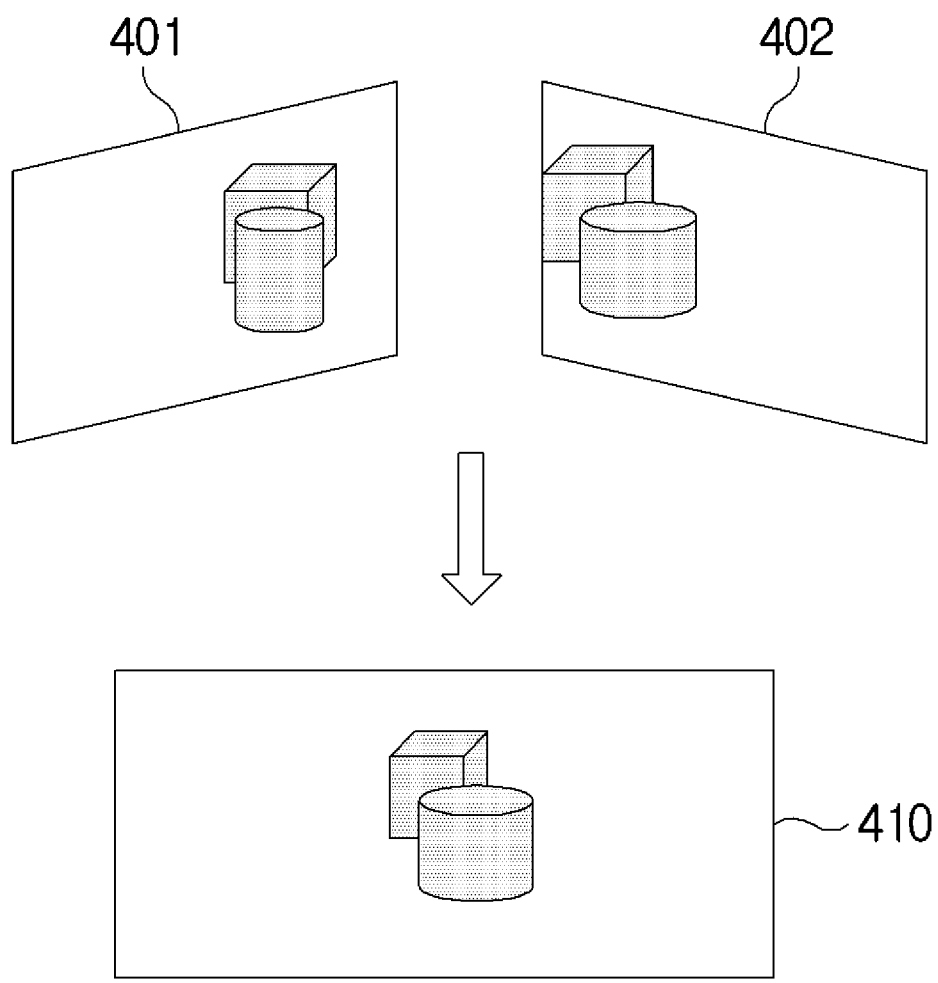
FIG. 4 is a view illustrating a relation between a synthetic image and an original image processed by an apparatus for processing information of multiple cameras according to an embodiment of the present disclosure.

FIG. 4 is a view illustrating a relation between a synthetic image and an original image processed by an apparatus for processing information of multiple cameras according to an embodiment of the present disclosure.

The synthetic image 410 may be composed of a combination of original images 401 and 402 obtained by the multiple cameras in consideration of photometric and geometric variation relations of the original images 401 and 402 as described above.

For example, a synthetic pixel $X_C$ of the synthetic image 410 may be composed of a combination of the first weighting $W_A$ obtained by applying photometric and geometric variation relations to the first original pixel $X_A$ of the first original image 401 and the second weighting $W_B$ obtained by applying photometric and geometric variation relations to the second original pixel $X_B$. Here, the first weighting $W_A$ and the second weighting $W_B$ may be previously calculated from an image synthesis algorithm, and pre-calculated data may be managed in format of a look-up table.

Furthermore, the synthetic image may be composed of a combination of various numbers of original images. Also, depending on how many original images are combined to form the synthetic image, weightings applied to original images may differently set. Therefore, in the look-up table, depending on the number of original images composing the synthetic image, weightings applied to original images may be set.

Based on this, the image processor 15 may identify the number of multiple cameras 11a and 11b, and may identify the look-up table to which weightings corresponding to the number of the multiple cameras 11a and 11b are applied. Weighting information contained in the identified look-up table is applied to the original images obtained from the multiple cameras 11a and 11b so as to form the synthetic image.

Figure 5:
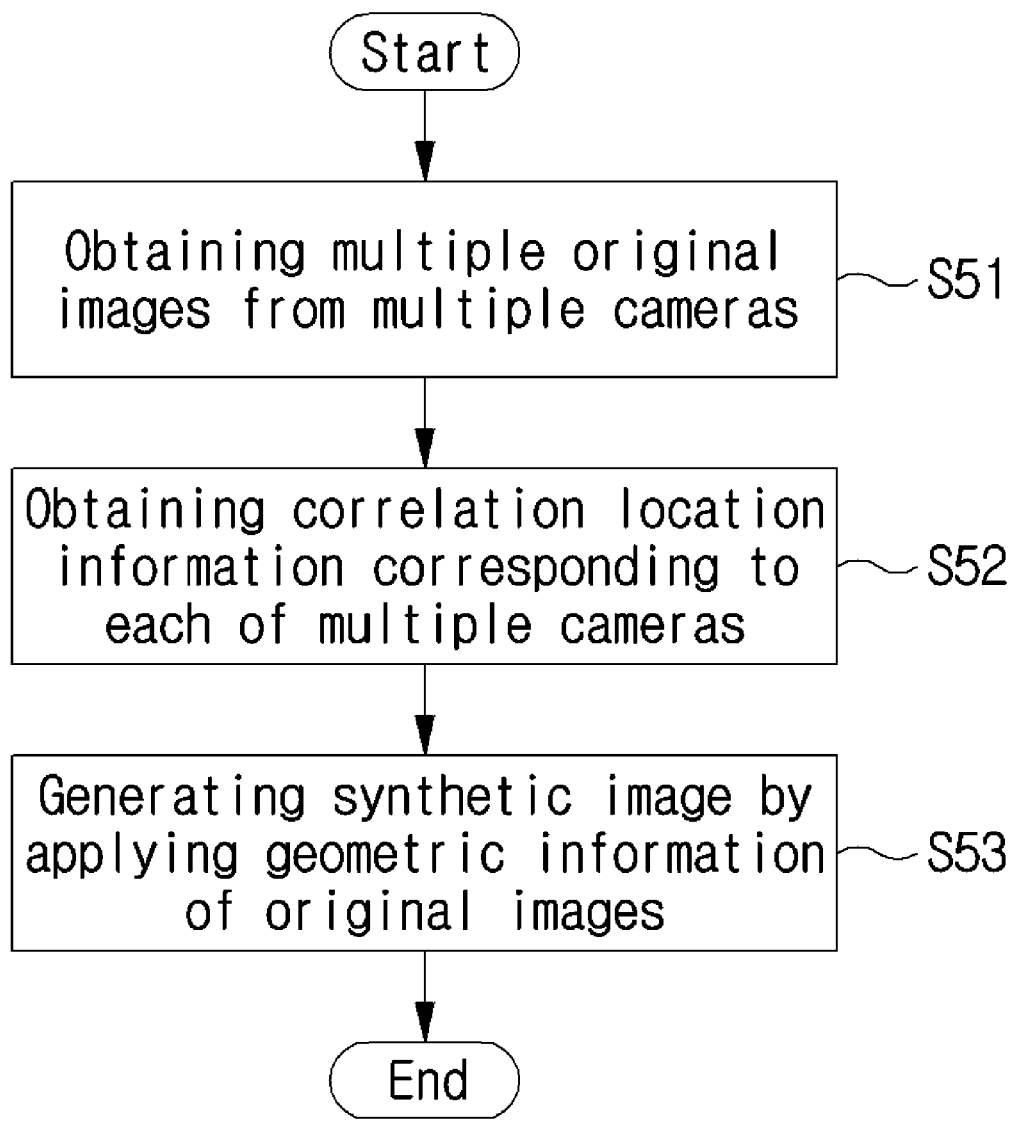
FIG. 5 is a flowchart illustrating a method of processing information of multiple cameras according to an embodiment of the present disclosure.

FIG. 5 is a flowchart illustrating a method of processing information of multiple cameras according to an embodiment of the present disclosure.

The method of processing information of multiple cameras may be performed by the apparatus for processing information of multiple cameras.

At step S51, the apparatus for processing information of multiple cameras may obtain several original images obtained by the multiple cameras based on the multi-camera system.

At step S52, the apparatus for processing information of multiple cameras may obtain correlation location information corresponding to the multiple cameras. For example, the apparatus for processing information of multiple cameras may obtain the distance data obtained through a distance meter that is capable of measuring a distance from a subject included in images obtained by the multiple cameras to the multiple cameras.

Particularly, the apparatus for processing information of multiple cameras may generate and output both a location information identification device identifier that identifies a location information identification device and location information including distance data obtained measuring a distance to the detected subject (or object).

At step S53, the apparatus for processing information of multiple cameras may identify information on the photographing direction, the photographing direction, etc. of the multiple cameras provided based on the multi-camera system, and may generate the synthetic image by applying geometric information of the original images obtained at the positions of the multiple cameras.

Figure 6:
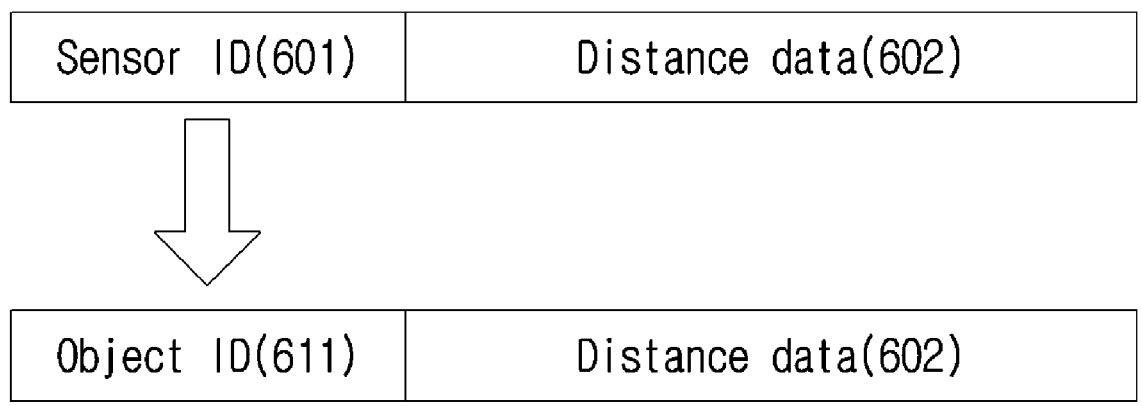
FIG. 6 is a view illustrating operation of converting location information in the method of processing information of multiple cameras according to an embodiment of the present disclosure.

In the process of generating the synthetic image at step S53, the apparatus for processing information of multiple cameras may use, as the geometric information, location information provided at step S52. Specifically, the received location information may include a device identifier 601 (referring to FIG. 6) and the distance data 602. The device identifier 601 is unable to specify an object included in the image. Therefore, the device identifier 601 detected from the received location information may be converted into the object identifier 611.

As described above, since the location information converted based on the object identifier may be matched with each object of each of several original images, the location information may be used as important information for rectification or calibration of the original images in the process of generating the synthetic image.

In the meantime, as another example, as correlation location information, a depth image obtained by the depth camera may be obtained and provided. In this case, the apparatus for processing information of multiple cameras may calculate the distance data from a relevant camera to the object based on the depth image, and may use the calculated distance data in image rectification and geometric transformation.

Figure 7:
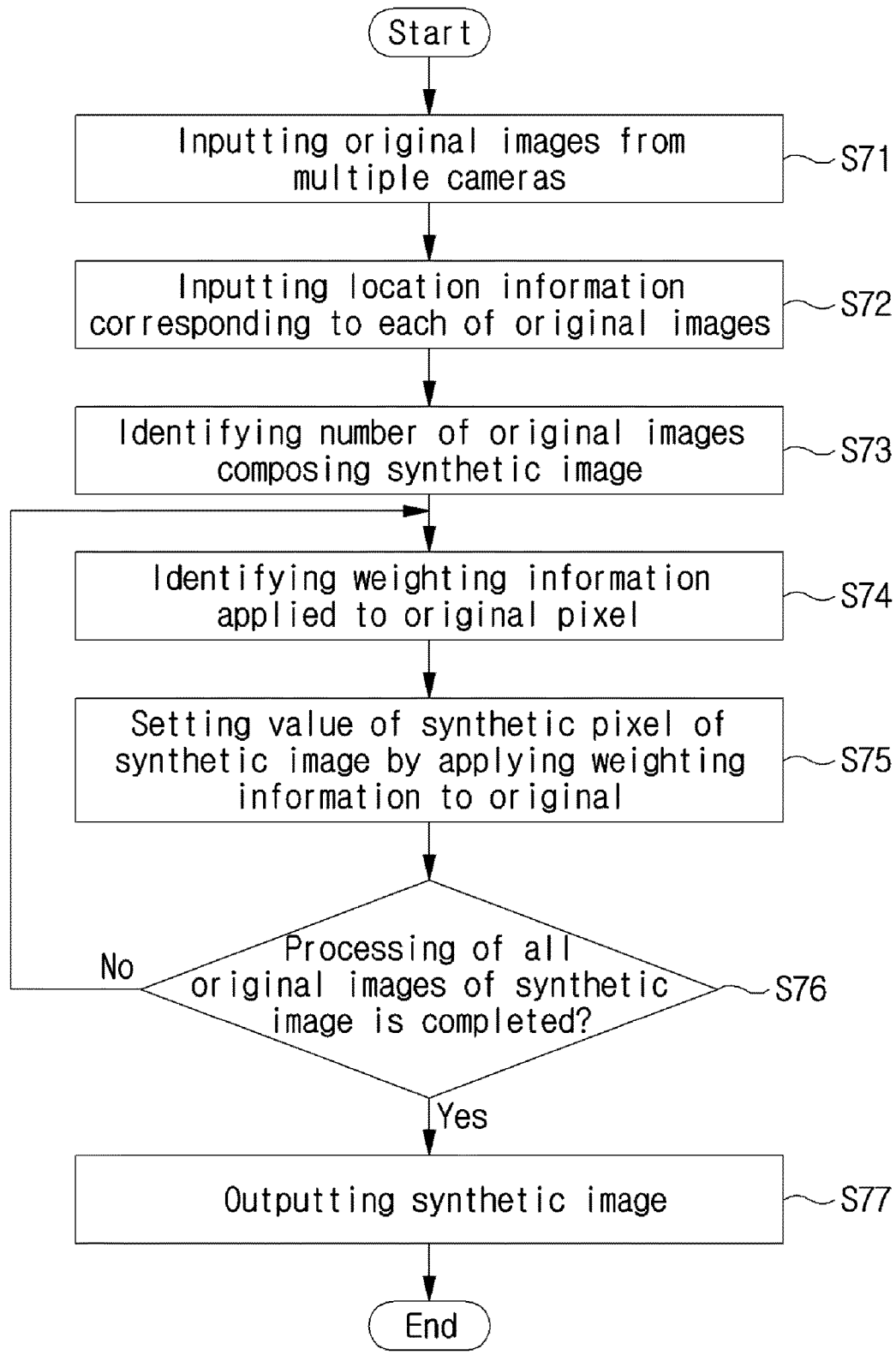
FIG. 7 is a flowchart illustrating a method of providing a synthetic image using multiple cameras according to another embodiment of the present disclosure.

FIG. 7 is a flowchart illustrating a method of providing a synthetic image using multiple cameras according to another embodiment of the present disclosure.

The method of providing a synthetic image using multiple cameras may be performed by the apparatus for processing information of multiple cameras (particularly, the image processor).

The apparatus for processing information of multiple cameras receives original images from the multiple cameras at step S71, and receives location information corresponding to the original images at step S72.

In the meantime, a synthetic pixel $X_C$ of the synthetic image 410 (referring to FIG. 4) may be composed of a combination of the first weighting $W_A$ obtained by applying photometric and geometric variation relations to the first original pixel $X_A$ of the first original image 401 and the second weighting $W_B$ obtained by applying photometric and geometric variation relations to the second original pixel $X_B$.

Here, the first weighting $W_A$ and the second weighting $W_B$ may be previously calculated from an image synthesis algorithm, and the pre-calculated data may be managed in formation of a look-up table. Furthermore, the synthetic image may be composed of a combination of various numbers of original images. Also, depending on how many original images are combined to form the synthetic image, weightings applied to the original images may be differently set. Therefore, in the look-up table, depending on the number of original images composing the synthetic image, weightings applied to original images may be set.

Considering the above, the apparatus for processing information of multiple cameras identifies the number of original images composing the synthetic image at step S73. The apparatus for processing information of multiple cameras may identify a weighting table that is set considering the number of original images composing the synthetic image, and may identify weighting information applied to each of original pixels included in the original image at step S74.

Next, the apparatus for processing information of multiple cameras sets a value of the synthetic pixel which is an area of the synthetic image by applying weighting information to each of original pixels of the original image at step S75.

Steps S71 to S75 are repeated until input of all original images composing the synthetic image is completed, all values of synthetic pixels of the synthetic image are set, and the synthetic image is output at step S76.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

Figure 8:
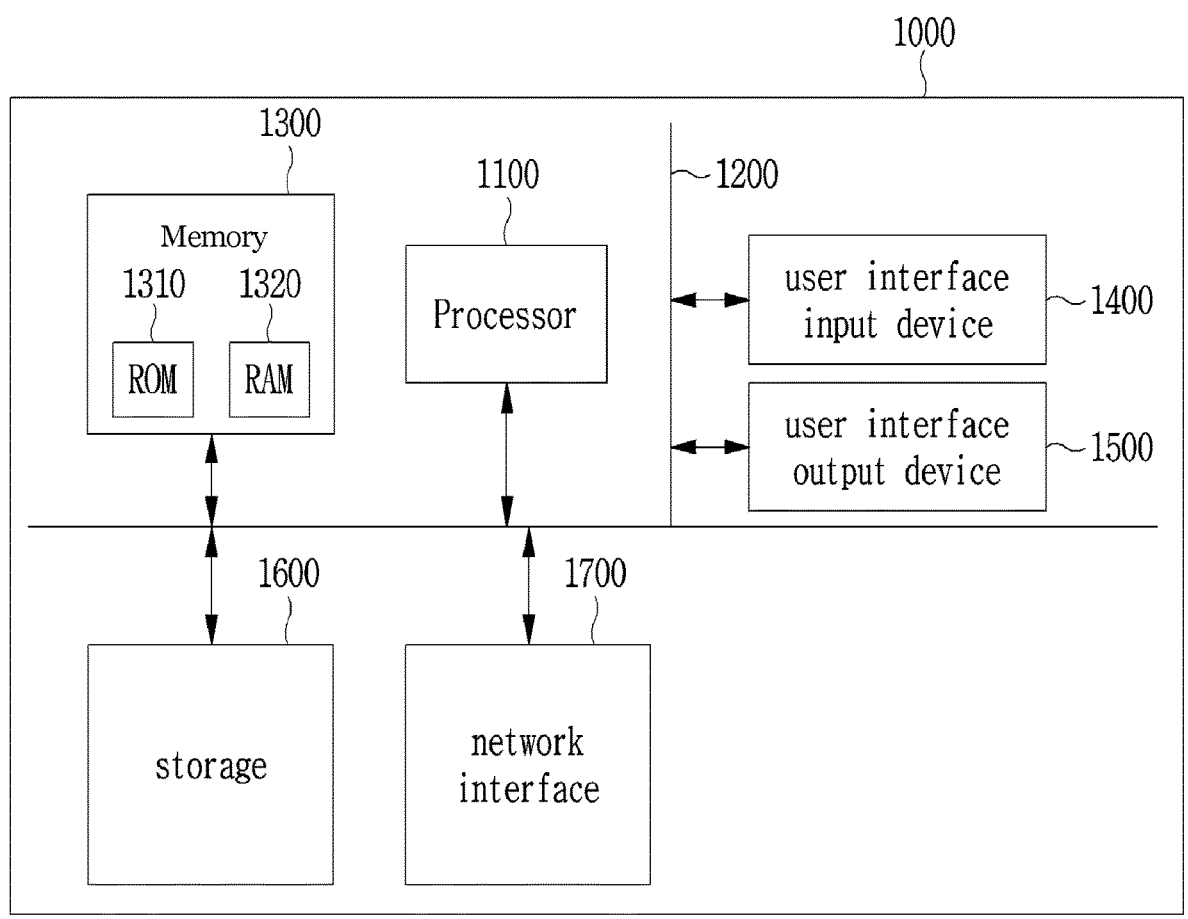
FIG. 8 is a block diagram illustrating a computing system for executing an apparatus and method for processing information of multiple cameras and an apparatus and method for providing a synthetic image using multiple cameras according to an embodiment of the present disclosure.

FIG. 8 is a block diagram illustrating a computing system for executing an apparatus and method for processing information of multiple cameras and an apparatus and method for providing a synthetic image using multiple cameras according to an embodiment of the present disclosure.

Referring to FIG. 8, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An apparatus for processing information of multiple cameras, the apparatus comprising:
   multiple cameras obtaining an image containing at least one object;
   a location information identification unit identifying relative location information between the at least one object and one of the multiple cameras, the location information identification unit being provided in each of the multiple cameras, wherein the relative location information comprises a device identifier identifying the location information identification unit and a location data between the at least one object and one of the multiple cameras; and
   an image processor processing image information obtained from the multiple cameras by using the relative location information received from the location information identification unit and converting the device identifier received from the location information identification unit into an object identifier identifying the at least one object.

2. The apparatus of claim 1, wherein the location information identification unit includes a depth camera obtaining a depth image of the image containing the at least one object.

3. The apparatus of claim 2, wherein the image processor provides the depth image of the image as the location information.

4. A method of processing information of multiple cameras, the method comprising:
   obtaining an image containing at least one object by using multiple cameras;
   determining relative location information from each of the multiple cameras to the at least one object, wherein the relative location information comprises a device identifier identifying the location information identification unit and a location data between the at least one object and one of the multiple cameras; and
   processing, by using the relative location information, image information obtained from the multiple cameras, wherein the processing of the relative image information comprises:
   determining the device identifier and the location data; and
   converting the device identifier into an object identifier identifying the at least one object.

5. The method of claim 4, wherein the determining of the relative location information comprises:
   obtaining a depth image of the image containing the at least one object from a depth camera provided at a location corresponding to each of the multiple cameras.

6. The method of claim 5, wherein the processing of the image information comprises:
   providing the depth image of the image as the location information.

7. A method of providing a synthetic image, which is a combination of multiple images, using multiple cameras, the method comprising:
   receiving multiple images obtained from multiple cameras;
   receiving multiple pieces of relative location information provided from multiple location information identification units respectively provided at locations corresponding to the multiple cameras;
   matching an original pixel included in each of the multiple images with a synthetic pixel included in a synthetic image in consideration of the relative location information corresponding to the multiple cameras and a relation between the multiple images and the synthetic image;
   identifying a value of the original pixel for each of the multiple images and applying the value of the original pixel to a value of the synthetic pixel; and
   generating the synthetic image by combining values of synthetic pixels.

8. The method of claim 7, wherein the matching of the original pixel with the synthetic pixel comprises:
   identifying a number of the multiple images constituting the synthetic image; and
   identifying both the synthetic pixel to which the original pixel is applied and a weighting from a predetermined weighting table in consideration of the number of the multiple images.

9. The method of claim 8, wherein the applying of the value of the original pixel to the value of the synthetic pixel comprises:
   applying the weighting to the value of the original pixel, and applying the value of the original pixel to which the weighting is applied to the value of the synthetic pixel.

10. The apparatus of claim 1, wherein the location information identification unit includes distance meters measuring distances between a subject photographed respectively by the multiple cameras and the multiple cameras.

11. The apparatus of claim 1, wherein the image processor determines at least one relative position between the multiple cameras.

12. The apparatus of claim 11, wherein the image processor determines at least one relative rotation angle between the multiple cameras.

13. The method of claim 4, wherein determining relative location information includes measuring distances between a subject photographed respectively by the multiple cameras and the multiple cameras.

14. The method of claim 4, wherein processing image information includes determining at least one relative position between the multiple cameras.

15. The method of claim 13, wherein processing image information includes determining at least one relative rotation angle between the multiple cameras.

16. The method of claim 7, wherein the relative location information comprises distances between a subject photographed respectively by the multiple cameras and the multiple cameras.

17. The method of claim 7, wherein matching the original pixel with the synthetic pixel includes determining at least one relative position between the multiple cameras.

18. The method of claim 17, wherein matching the original pixel with the synthetic pixel includes determining at least one relative rotation angle between the multiple cameras.

19. The method of claim 17, wherein matching the original pixel with the synthetic pixel includes calibrating the multiple cameras using at least one relative position between the multiple cameras.

* * * * *